United States Patent Office 3,738,961
Patented June 12, 1973

3,738,961
COPOLYMERS OF BIS-OXAZOLINES AND DITHIOL COMPOUNDS AND PROCESS FOR THEIR PREPARATION
Donald A. Tomalia and Bruce P. Thill, Midland, Mich., assignors to The Dow Chemical Company, Midland, Mich.
No Drawing. Original application June 16, 1969, Ser. No. 833,759. Divided and this application Dec. 9, 1970, Ser. No. 96,626
Int. Cl. C08g 20/00
U.S. Cl. 260—47 CZ                9 Claims

ABSTRACT OF THE DISCLOSURE

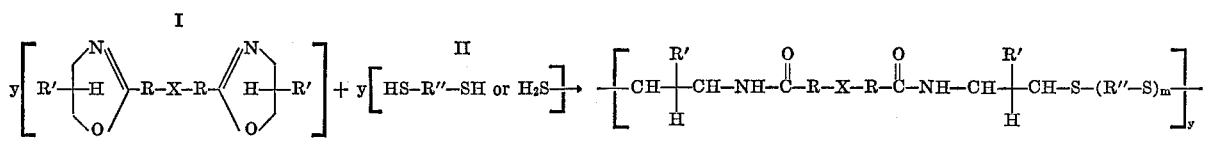

wherein

R=alkylene, arylene or arylalkylene
R'=hydrogen or lower alkyl
R''=alkylene, arylene, arylalkylene, cycloalkylene, or substituted cycloalkylene groups
X=—O— or —S—
m=0 or 1
y=molar quantity of monomers and degree of polymerization of polymers.

Also with excess of either I or II the polymer has

or —SH end groups which react with

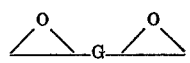

to yield epoxy resin copolymers, when G is the moiety bridging between oxirane groups in a polyepoxide adapted to be cured to obtain an epoxy resin: and processes for making the above. The resins are adapted to be employed as adhesives, and as thermoplastic to thermoset polymers for production of plastic articles of manufacture.

This application is a divisional application of my copending application Ser. No. 833,759, filed June 16, 1969, now U.S. Pat. No. 3,670,046.

BACKGROUND OF THE INVENTION

Field of the invention

This invention is concerned with copolymers of, on one hand, dithiol compounds and, on the other hand, bis-oxazoline compounds, optionally modified by copolymerized residues from polyepoxides that are curable to obtain epoxy resins. The resulting products are resins of widespread usefulness as plastic materials, and, depending upon identity and method of cure, are readily exhibited as films, castings, fibers, and the like, extraordinarily resistant to abrasion, impact, and the like.

The prior art

The reaction of hydrogen sulfide with 2-phenyl-2-oxazoline to obtain N-(2-hydroxyethyl) thiobenzamide has been shown by Goldberg and Kelly, 1948 Journal of the Chemical Society (London) 1919; the attack of thioacids upon oxazoline with ring opening has been reported variously, the earliest being believed to be 18 Journal of Organic Chemistry 438, 802 (1950) by Fry; see also U.S. Pat. 2,823,207 (1958).

The opening of the ring of 2-oxazoline with aromatic thiols to give N-aryl mercaptoalkyl amides has been reported variously including Wehrmeister, 28 Journal of Organic Chemistry 2587 (1963). The reversible polymerization of 1,3-oxazolidine-2-thiones, possibly involving tautomery, is discussed at 31 Journal of Organic Chemistry 32 by Mukaiyama et al.

DESCRIPTION OF THE PRESENT INVENTION

The monomers

In the present invention the bis-oxazoline monomers are compounds of the formula

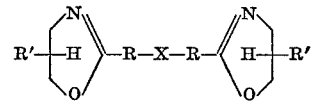

wherein R is alkylene of from 2 to 20, both inclusive, carbon atoms, arylene of from 6 to 10, both inclusive, carbon atoms, arylalkylene of from 7 to 15 carbon atoms, both inclusive, R' in each occurrence is independently selected from hydrogen, alkyl of from 1 to 4, both inclusive, carbon atoms; and X is oxygen or sulfur.

The dithiol compounds to be used as comonomers in the present invention are of the formula

Where R'' is of the scope of R, as defined above, or can additionally be cycloalkylene of from 4 to 7, both inclusive, carbon atoms or substituted cycloalkylene of from 5 to 12, both inclusive, carbon atoms, and k is from >1 to all available substituent sites on R'', and typically 2.

Hydrogen sulfide, while not a dithiol, is a compound that presents more than one hydrogen atom each active and each bound to sulfur; and these are the characteristics of a compound that will react as comonomer in this invention. Hydrogen sulfide, therefore, is a comonomer to be used as are the dithiol compounds.

As noted hereinbefore, when either the thiol or oxazoline comonomer is employed in excess, the excess provides chain-terminating mercapto or oxazoline moieties. From the reactivity of such terminal groups, the copolymers of this invention thus produced can be used to react with 1,2-polyloweralkylepoxide compounds that are curable to obtain epoxy resins; and by such expedient there is produced a product of this invention that is a copolymer of the dithiol-oxazoline type modified by containing also epoxy resin moieties.

The relative amount of thiol compound or bisoxazoline compound for such epoxy resin copolymers can be varied from that equimolecular with the dithiol compound to an amount which, with respect to the conventional polymer formula, can be expressed as $y+n$ when $0<n<2$.

As is usually true in the polymer art; the value of $y$ is known only as an average value with a range of deviations; but the exact determination of these matters is not critical so long as the products of the resulting polymer are satisfactory for their purpose. In general, values of $y$ will usually lie in the range of from about 30 to a few thousand, perhaps four or five thousand, and typically in the range of from about 50 to 250. Values in these ranges can be used for guidance in conducting simple range finding tests to fix a precise value of $n$ to obtain a polymer product of any desired range of properties.

A polyepoxide comonomer to be employed in this invention is a compound of the general formula

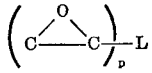

wherein $1 < p$ and L is a polyepoxide nucleaus structure. Typical such nuclei as of the above formula include (isopropylidenebis(phenyleneoxymethylene)) or its polybrominated derivatives, such as the 1 to 4 brominated derivatives. Also ω-(methylenyloxy)phenyl poly(((methylenyloxy)phenylene)methylene) among other routine and well known structures in the art of polyepoxides that are curable to obtain epoxy resins. In particular, any curable poly-1,2-epoxide that is an article of commerce and that is, or can readily be rendered, a liquid, is to be employed.

When desired, the polyoxazoline-polythiol mixture can be heated and copolymerized only partially, to obtain an intermediate material of average molecular weight severalfold greater than that of the starting materials but yet relatively reactive with polyepoxides in further polymerization reactions. This material can be held for useful intervals of time after preparation and before use. It can be regarded as a "prepolymer."

Such prepolymer can be employed in various ways.

By itself it can be modified as by the addition of fillers, coloring materials, opacifying or reflective materials, and the like, and then, by further heating at a reaction temperature, fully polymerized with capture of the additives within the resulting polymeric mass.

In another embodiment, it can be mixed and blended with a polyepoxide that is curable to obtain an epoxy resin, and the resulting mixture heated to cure to obtain a useful copolymeric resin of recurring moieties derived from the indicated starting materials. The exact properties of the resulting cured resins depend upon the relative abundance of starting materials and also upon details of cure cycle observed.

The starting materials can be employed in any ratio of relative abundance in such polyoxazoline-polythiolpolyepoxide mixture, provided that neither polythiol nor polyoxazoline is supplied in amount less than ten percent by equivalent weight of total mixture. Ratio of polyepoxide can also vary widely provided that not more than 75 percent of total mixture, by equivalent weight, in such polyepoxide.

In general, such terpolymers of larger polyepoxide content tend to be cross-linked and thermosetting, and thus insoluble and infusible; whilst those of very low polyepoxide content or none tend to be fusible and of at least limited solubility.

In general those in which prepolymerization was limited and the prepolymer units relatively small, other things being equal, tend to yield more highly crosslinked epoxy terpolymers; whilst those in which prepolymerization was extensive and the polythiol-polyoxazoline prepolymer units relatively large tend to yield less highly crosslinked epoxy terpolymer products.

By the application of the foregoing aspects of rational, polymer chemists can greatly reduce any necessary simple range-finding tests required to perfect a desired embodiment of this invention.

While all the compounds thus comprehended are comonomers to be used in this invention, those of simpler molecular structure will, in general, be preferred, as being usually easier and less expensive to produce. When thermal stability of the resulting products is a major factor, then preference will usually be given to those in which all possible variable necessary moieties are aromatic.

In the choice of monomers with respect to the synthesis of a polymer, a mixture of substances within the generic statement above but of dissimilar identities may be chosen, to obtain a product representing properties representing the polymer derived from such monomer mixture.

In the polymerization of the instant copolymerizable mixture of comonomers, the oxazoline undergoes ring opening between the oxygen and the carbon atom in position number five, that is, the carbon atom adjacent the ring oxygen and separated by another ring carbon atom from the ring nitrogen. As the nitrogen accepts hydrogen from the copolymerizing mercapto group, the formerly doubled bond between nitrogen and the carbon atom in position number two, that is, the carbon atom between the oxygen and the nitrogen, breaks and remains as a single bond; the available valences then being used to bind the hydrogen, mentioned, and to bind the oxygen in a carbonyl group whereby an amide linkage is formed. The sulfur from which mercapto hydrogen has gone to the nitrogen then bonds with the number five carbon atom by the valence left upon ring opening.

The chain thus propagating can, if desired, be terminated predominantly with either oxazoline groups that have not undergone ring-opening, or with mercapto groups that have not been split, by the simple expedient of supplying either reactant, as desired, in slight excess over equivalent. If the reactants are supplied in exact stoichiometric amount, the chains tend to be terminated by the indicated groups; but with no quantitative predominance of one over the other.

The polymers of this invention, then, are represented by the generic structure

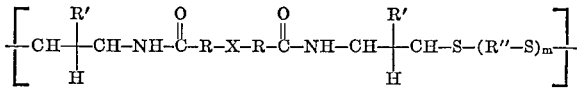

when the polythiol is a dithiol. The polymers from higher polythiols manifest crosslinking through the thiol sites.

These polymeric products, when in liquid form, are adapted to be used as curing agents to cure polyepoxides to obtain epoxy resins. The mechanism by which such cure of epoxy resins is accomplished is not known; but a polymer of this invention may be used in admixture with such polyepoxide in quantities from 10 percent to 90 percent of either material, by weight of total mixture; and the resulting mixture undergoes some chemical reactive process that is not completely understood by which the polyepoxide cures; and each of the polyepoxide and the polymer of this invention loses its individual identity in the resulting modified epoxy resin.

The epoxy resins thus cured have the properties of typical cured epoxy resins, including adhesivity, hardness and mechanical strength; those of higher content of the linear poly-secondary amides of this invention tend to manifest the modification of properties towards those of the unmodified polyamides; those of higher polyepoxide derivative content tend to manifest modification of properties towards those of the unmodified epoxy resins.

The resulting resins appear to be highly cross-linked and of excellent mechanical, thermal, and electrical properties, and of excellent resistance to solvent attack.

Representative and illustrative, but not limiting, monomers are designated hereinafter in conjunction with methods and starting materials for their synthesis.

SYNTHESIS OF POLYOXAZOLINE MONOMERS

The instant oxazoline monomers are readily synthesized in various ways. Most are dioxazolines and they are illustrative but not limiting, as polyoxazolines of up to four oxazoline rings are readily prepared. In one convenient route, there is first prepared a bis-2-oxazoline having an ethylenic unsaturation as, or in, a substituent on the 2-carbon atom of the oxazoline ring. Two moles of this unsaturated compound are then reacted by free-radical addition with hydrogen sulfide or with a dithiol. When hydrogen sulfide is employed, the moieties designated in the generic formula by —R— become the saturated counterpart of the starting unsaturated material, bonded in a bisoxazolinylalkyl thioether structure. The identity of R is readily controlled by choice of the unsaturated compound. In either case, oxazoline reactant is to be employed in twice equivalent amounts with thiol in preparation of such bis-oxazoline compound.

The reactions are favored by the presence of a free radical reaction catalyst, and tend to go forward advantageously under moderate heat. An appropriate catalyst is 2,2′-azobis(2-methylpropionitrile) which is sometimes called azobisisobutyronitrile, or, as hereinafter, AIBN. Also, or as an alternative, actinic radiation favors the reaction.

In carrying out the addition of H₂S or a dithiol compound to an oxazoline compound containing an olefinic unsaturation, to prepare a bis-oxazoline thioether starting material to be used herein (and not to be confused with later dithiol comonomer) it will usually be preferred to combine a first reactant with the free radical catalyst if one is employed, and thereafter add, with continuous stirring and heating, the second reactant portionwise and with stirring to complete the reaction mixture. Which of the two reactants is first to be introduced into a reaction vessel is optional, or can be decided upon the basis of the properties of the materials employed. Thus, if the dithiol compound is a solid except liquefying when heated, it may be desired to add such dithiol compound first to the reaction vessel and, by heating, liquefy it; if both are liquids, then the one to be added first to the reaction vessel may be chosen upon the basis of suppression of odor of dithiol, if any, or the like.

It will usually be preferred that the reactants be combined by the addition, to the reaction mixture, of the second reactant, slowly, portionwise, or stillicidiously; with heating at a reaction temperature and continuous stirring.

Upon the completion of the combining of the reactants, the elapse of a further interval of reaction time is usually advantageous, and during such interval of time, heating can be maintained at the reaction temperature to carry the reaction to such degree of completion as is believed efficient. In general, a further reaction interval of the completed reaction mixture of the general order of duration required earlier to combine the reactants gives good results.

The unsaturated oxazoline compound, in its turn, is readily prepared by reacting an appropriate bishaloimidoester in the presence of strong base whereby to cyclodehydrohalogenate it.

The bishaloimidoester compound, in its turn, is readily prepared by the reaction between an alkylene chlorohydrin or substituted alkylene chlorohydrin and a saturated haloalkyl cyano compound or an unsaturated alkenyl cyano compound in the presence of hydrogen chloride. No unusual reactants or catalysts are involved; and yields are good.

The reaction can be regarded as following the general course indicated in the succeeding general formulae which is illustrative of the reaction but not necessarily of the scope of the substituents and other variables. Such matters are as hereinbefore described and hereinafter claimed.

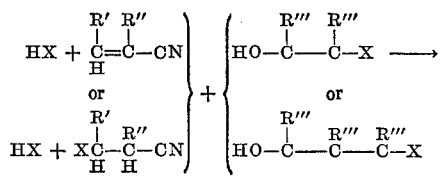

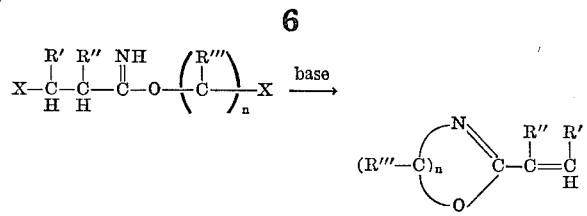

Desirably, the preparation of the instant compounds goes forward in the absence of water; and under inert gas blanket. The use of inert solvent is desirable. Supplied reactants are preferably scrubbed of water before being introduced to the present reaction system.

The needed alkenyloxazolines are readily prepared, as above noted, from the corresponding cyanoalkenyl compounds. A cyanoalkenyl compound is obtained, or prepared, wherein the cyano group appears at a site where an oxazoline is to appear. Substituents and the like in the alkenyl group appear in the products.

The precursor compound having a cyano group is simultaneously supplied with a lower alkylene chlorohydrin and with HCl as a dry gas, to obtain a reactive bishaloimidoester intermediate. This intermediate is then cyclodehydrohalogenated with base that accepts the elements of hydrogen halide, to obtain the intermediate or alkenyloxazoline.

Such intermediate is then reacted with H₂S or a dithiol, as required, to prepare the mercaptoalkyl- or mercaptoaryl bis-oxazoline compounds.

The unsaturated cyano compounds useful as precursors in this invention are, in general, articles of commerce. Representative such compounds are to be found in, for example catalog number 14 (1969–1970) of Aldrich Chemical Company, and see especially pages 600–602 for a topical listing with synonymy.

The compounds are readily prepared. Aliphatic cyano compounds, under the designation of "nitriles" are prepared according to U.S. Pat. 2,770,643 and the isolation of the unsaturated substances is routine. Alternatively, the procedures of Bailey et al. are available; 1958 Journal of the Chemical Society 4508. The aromatic cyano compounds with aliphatic unsaturation have long been available: as an early preparation, note the 1884 method of Kruss, 17 Berichte der deutschen chemischen Gesellschafft 1768.

An excellent review has been published, within the compass of which are to be prepared all the cyano compounds needed to practice the instant invention, at 42 Chemical Reviews 189, and in the references there incorporated. That review is incorporated here to the extent necessary to practice this invention.

The reaction scheme hereinabove set forth illustrates the preparation of an oxazoline having a single ethylenic substituent which may, itself, have substituents. Chemists will recognize that by the use, as starting material, of a longer chain cyano compound, aliphatic or aromatic, in reaction with chlorohydrin compound, such unsaturated substituent upon oxazoline is readily prepared in longer chain lengths, or containing other chemical moieties. The reaction scheme set forth hereinabove is illustrative only.

For other synthetic routes, see the summary by Wiley et al. in 44 Chemical Reviews 447–475. As noted, the oxazolines are prepared in similar routes. Other modes of synthesis are available.

The ozazoline compounds to be used in this invention are all easily produced by any of a group of synthetic routes all of which pass, advantageously, through a cyano group; in the sense that, at each molecular site where an oxazoline heterocycle is desired, there is provided as a precursor site, a cyano. From such site it is, in general, convenient and easy to go on to the desired heterocycle. The only condition believed to be limiting at this juncture is that, with respect to the reactions that go on from the cyano to the heterocycle, preferably the cyano be the most reactive or only significantly reactive site: or, if any other site on the starting cyano compound be more reactive than cyano, then known alternative procedures must be considered.

Many synthetic routes are known by which to provide reactive cyano sites as desired.

As illustrative, when R is an aromatic nucleus, so that —R—X—R— is a phenyl ether or sulfide nucleus, such starting material can be caused to react with formaldehyde in the presence of hydrochloric acid, to obtain a ring-chloromethylated product. Ring isomery may be controlled, or ignored. This product can then be caused to react with potassium cyanide in a routine metathesis to obtain cyano sites replacing the α-chlorine upon the chloromethylated sites. From such cyano sites, further synthesis of the instant oxazolines is routine, as is shown below. It is not objectionable if slightly more or moderately fewer than exactly two such sites appear on any individual molecule.

In other procedures, a starting aromatic compound can initially carry aromatic hydroyl groups at sites of subsequent reaction.

Such material can be condensed with an aliphatic cyano compound, in routine cyanoalkylation, to obtain, at the former hydroxyl sites, cyano alkyl ether structures that are then ready, as cyano compounds in general are, for further use in this invention.

In another procedure, chloromethylated styrene is caused to react with hydrogen sulfide, or with a dimercaptoalkane or the like, under free radical reaction conditions, such as are provided by the use of 2,2'-azobis(2-methylpropionitrile) as catalyst, a material which is often simply designated AIBN. Such reaction produces the saturated adduct, for example, bis(chloromethylphenylethyl) sulfide. Of such structure and related structures, the chloromethyl site reacts readily with potassium cyanide to obtain the corresponding bis-cyanomethyl compound from which oxazoline derivatives are readily prepared.

Aliphatic oxazoline-bearing structures are equally readily prepared. Acrylonitrile is immediately available and is representative, as are the large number of other aliphatic cyano compounds. Reaction of the double bond with hydrogen sulfide or water obtains the saturated bis(2-cyanoethyl) sulfide or ether, which can be used to obtain an oxazoline.

In another procedure, oxetane can be reacted with hydrogen cyanide to obtain 3-cyano-1-propanol which can be etherified in the presence of dehydrating agent such as sulfuric acid to obtain the bis(3,3'-cyanopropyl) ether.

From the cyano compound which in some structures can be classified as a nitrile, various routes to the instant oxazoline structures are available. Each involves a first acyclic substitution at the cyano sites followed by a cyclizing reaction.

The most forthright route, procedurally, involves reactions of a mechanism which, when set out in detail, appears complicated; but procedures remain simple. This route involves causing a reaction of the cyano compound precursor with a lower alkylene chlorohydrin in the presence of hydrogen chloride, and upon the completion of that reaction, cyclizing the resulting intermediate with a substance, usually a base, which is an acceptor for the elements of hydrogen halide, such as triethylamine, trimethylamine, or an alkali metal hydroxide. With ethylene chlorohydrin (2-chloroethanol) this procedure leads to the oxazolines.

Alternative to the foregoing, yet starting from the cyano structure, a group of related synthetic routes proceeds by a first oxidation of the cyano to the carboxyl, as in the presence of sulfuric acid and under protonating conditions. Upon completion of the conversion to the carboxyl form, the resulting intermediate is then converted to the acyl halide, such as the chloride; in one convenient method this conversion is brought about by reaction of the carboxyl compound with thionyl chloride. Acyl halides other than the chloride are available; and can be used.

From the acyl halide form, various optional routes proceed. The acyl chloride reacts readily with aziridine (ethyleneimine) to obtain an intermediate which, in turn, in the presence of basic hydrogen chloride acceptor, cyclizes to the desired oxazoline structure.

From the acyl halide, another synthetic route requires reaction of the acyl halide with an amino alcohol, to produce an acyclic intermediate which, from the amino alcohol, is hydroxyl terminated and which, under moderate conditions of dehydration, gives the desired cyclic compound. The identity of the cyclic compound is determined by the number of linear carbon atoms between the hydroxyl and the amino groups. If two, the product is an oxazoline.

The reaction of alkenyloxazine or oxazoline and dithiol compound characteristically leaves small amounts of volatiles uncombined in the reaction mixture. In this situation, maintaining the reaction temperature, the reaction vessel interior is advantageously placed under sharply sub-atmospheric pressure ("vacuum"), and such volatiles drawn off.

Skilled chemists, in possession of the cited prior art and in view of the discussion foregoing, will be able to prepare the bisoxazoline monomers of the present invention.

The dithiol and other polythiol comonomers to be employed in the instant invention are well known in the art. Representative of such compounds are those taught in U.S. Pat. 3,399,239; and, in general, any polythiol desired as a comonomer to be used in this invention can be prepared in purity that is routinely sufficient by the time-honored reaction of an alkali metal hydrosulfide upon a polyhalohydrocarbon, of which each site sought to become a thiol site is initially halogenated. The modest amounts of sulfide and polysulfide usually produced in such process are not usually objectionable in the practice of this invention.

The copolymerizing of the instant comonomers is readily carried out by heating a mixture of the comonomers. Polymerization temperatures are characteristically substantially between 25° C. and 150° C. The resulting product may be thermosetting or thermoplastic, and products intermediate these in properties can be readily prepared. In at least some embodiments it does not dissolve in dimethylsulfoxide or dimethylformamide. It is often convenient to polymerize the monomer in the shape it is to occupy when cured. Also, when polymerization has gone forward only partially towards a chosen end point, and the resulting partially polymerized intermediate material is of viscosity and adhesivity severalfold greater than is characteristic of the unreacted monomer, the material can be drawn into filaments or passed through a spinneret or produced as a film and in that form further heated to complete polymerization.

To make use of the thermoplasticity of those that are thermoplastic, higher temperatures are required than are usually expected in the melting of polymers. The transition from hard to liquid takes place relatively promptly as required temperatures are attained. An inert gas blanket may be chosen, to reduce darkening of the polymer with heat.

The polymers thus produced are usually pale straw to yellow-brown in color, and are very slightly elastic-yielding to hand pressure: they are exceptionally tough under impact; have high resistance to propagation of a tear or break, and have, in general high resistance to abrasive wear and chemical attack. When ignited, they burn reluctantly and, in a lump, may be self-extinguishing. Sulfur dioxide is among the typical combustion products. They are of value in ablative heat shields of orbital re-entry vehicles.

The best mode now known to the inventors of practicing the same is now illustrated. While each of the comomers is hereinafter represented by a single occurrence of its formula, it is to be understood to be supplied in sufficient quantity to provide a desired quantity of polymer.

EXAMPLE 1

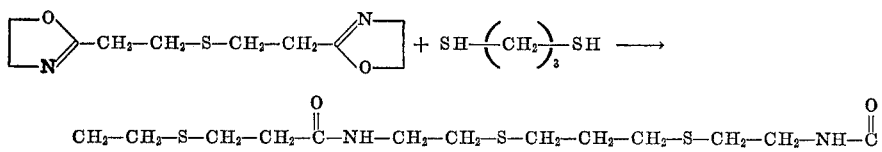

Of thiodiethylene-bis-(2-oxazoline) 11.40 grams (0.05 gram mole) is placed in a beaker and to it are added 5.4 grams (0.05 mole) of 1,3-propanedithiol. The result is a liquid mutual solution. Of this solution, a convenient aliquot, here approximately 2 milliliters, is pipetted into the interior of an open glass ampoule and this procedure is repeated with other ampoules to a total of four. The open necks of the ampoules are fused shut in an open flame. The sealed ampoules with comonomer mutual solution within are then placed on a wire rack in an oven having circulated air at 130° C. within, to bring about polymerization. The ampoules are examined visually from time to time, and periodically at previously planned times an indivadual ampoule is withdrawn, opened, and the nuclear magnetic resonance spectrum of the resulting ampoule contents is ascertained.

After four hours, the —S—H resonance inflection has virtually disappeared, and an inflection is noted extending in the region indicating the —NH— structure.

After eight hours under the indicated oven conditions, the resulting resin no longer flows at oven temperatures and it is not soluble in dimethyl sulfoxide or in hot dimethyl formamide.

Removed from the ampoule in which it is prepared, the resin is examined; it is found to be slightly yielding, very tough, very resistant to fracture or cutting with a knife; in common with other copolymers of this invention it exhibits a dielectric constant high enough to render it useful in the manufacture of electrical capacitors.

Substantially the same procedure is repeated except that the thiol is 1,2,3-trimercaptopropane (Thioglycerol). The product is similar but is infusible and insoluble in any solvent tested, including dimethyl sulfoxide and dimethyl formamide.

Procedurally, the preparation of other copolymers of bis-oxazoline compounds and polythiols is essentially the same in all cases. The use of sealed ampoules is convenient for small, experimental quantities, as a means of excluding air and of giving a convenient form to the prepared polymer. However, it is not essential that preparation be carried out in a sealed container. In the presence of oxygen, as in air, and at polymerization temperatures, there is some tendency for the polymercaptan to oxidize and form the derivative sulfide with loss of hydrogen as water. It is usually sufficiently economical of starting materials and conducive enough to good quality in product, that means of minimizing such oxidation will be justified. In industrial quantities, the use of a slowly moving nitrogen blanket will be suitable.

EXAMPLE 2

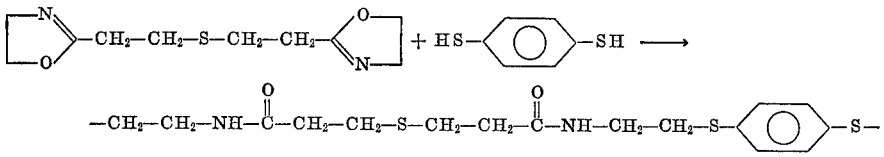

When intimately mixed and stirred together, equivalent amounts of thiodiethylene-bis - 2 - oxazoline and 1,4-benzenedithiol begin to co-react at once at room temperature, and the reaction goes forward at room temperature or at autogenous temperature not far above it, until the reaction is substantially complete. The cured, that is to say, substantially completely polymerized, product is a hard, greenish solid, breaking with conchoidal fracture. It melts sharply at about 205–208° C., but does not evidently decompose when held at 250° C. for an extended period of time. Below its melting temperature it is not soluble in any solvent of the many best regarded solvents for polymers with which it has been challenged, including dimethyl formamide and dimethyl sulfoxide. When in melted form, mixed with a polyepoxide that is curable to obtain an epoxy resin, such as the diglycidyl ether of bisphenol A, the copolymer of this example, as the other liquefiable copolymers of this invention, is highly effective as a curing agent for such polyepoxide, and there results a densely cross-linked, insoluble, infusible, thermoset resin in which the starting materials lose their identities, but it is, in general, a terpolymer of the benzenedithiol, the bis-oxazoline compound, and the derivative structure from ring-opening in the polyepoxide. It is hard, strong, of good resinous structural properties, and tenaciously adhesive to surfaces with which the uncured mixture was in contact during cure.

Substantially the same procedure is repeated except that the thiol is 1,2,4,5-benzenetetrathiol. The product is similar but is infusible and insoluble in any solvent tested, including dimethyl sulfoxide.

When it is desired to employ such polymer in the cure of a polyepoxide to obtain a polyamide-modified epoxy resin, the polyepoxide is added to the reaction mixture before the curing that is to say, the copolymerization of the instant polyamide has gone to completion, at a time when such admixing is convenient in view of the physical state of the partially copolymerized polyamide.

EXAMPLE 3

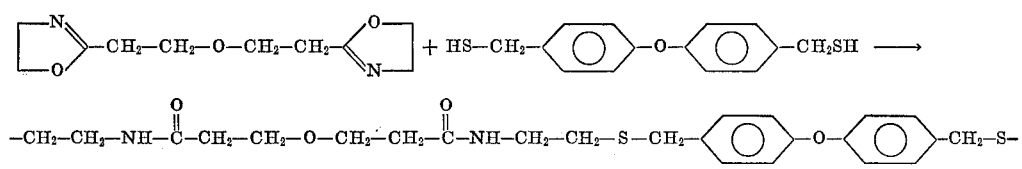

The copolymer is a yellow to brown solid. When lightly cured, that is, to a low molecular weight polymer it is an inelastically deformable solid. Upon cure to a high molecular weight solid it becomes a solid which, when broken, breaks with a conchoidal fracture. It is an excellent adhesive.

EXAMPLE 4

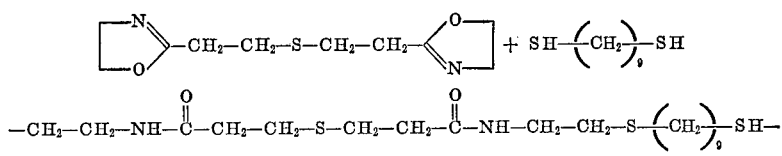

The copolymer resembles those foregoing: it is slightly more elastic at room temperature.

EXAMPLE 5

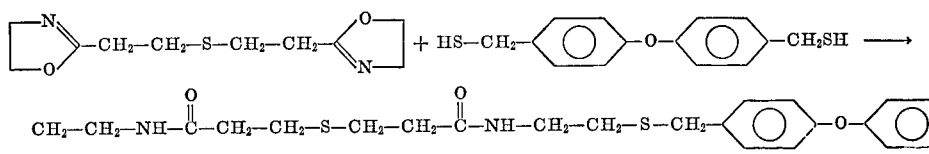

The copolymer product is similar to that of Example 3 but it manifests less tendency to support combustion. All the resins of this invention have some tendency to be self-extinguishing or, in any case, to burn with only a low flame which does not propagate rapidly upon the the polymer and is easily extinguished.

EXAMPLE 6

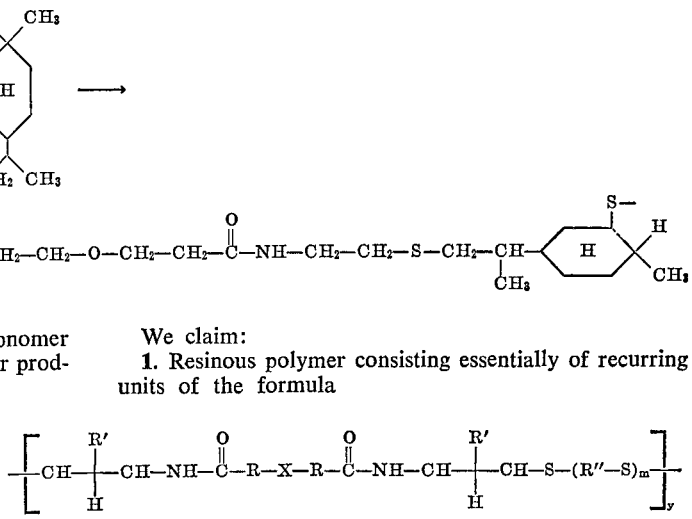

A copolymer is formed upon heating of the comonomer mixture. In properties it closely resembles the other products of this invention.

EXAMPLE 7

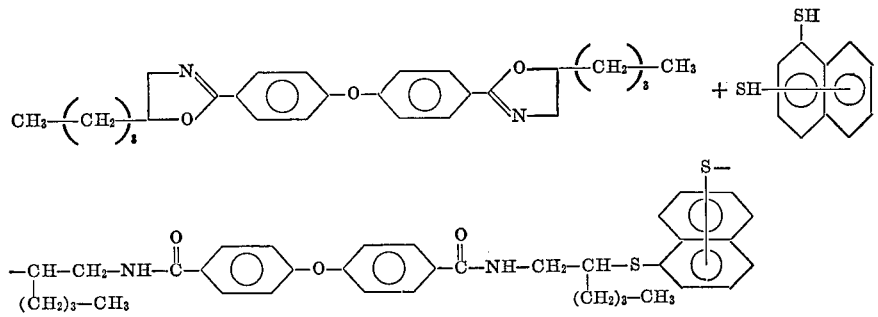

The mixture polymerizes at room temperature. Products resemble those foregoing: it is a good adhesive.

EXAMPLE 8

The product of Example 2 is melted, and at or slightly above its melting temperature, it is mixed with a diglycidyl ether product of bisphenol A. The mixture is promptly stirred to effect a homogeneous mixture and the resulting mixture is held at the indicated temperature until, by solidifying to a solvent-resistant material, it gives evidence of the cure of the polyepoxide.

EXAMPLE 9

The product of Example 6 is finely powdered and taken up in cyclohexane; and the resulting dispersion is intimately admixed with an equal weight of a polyepoxy novolak. Solvent is removed under sharply subatmospheric pressure and the resulting mixture is heated at 150° C. for four hours. The result is a cured, infusible, insoluble, hard, epoxy resin modified by its content of polyamide.

We claim:
1. Resinous polymer consisting essentially of recurring units of the formula

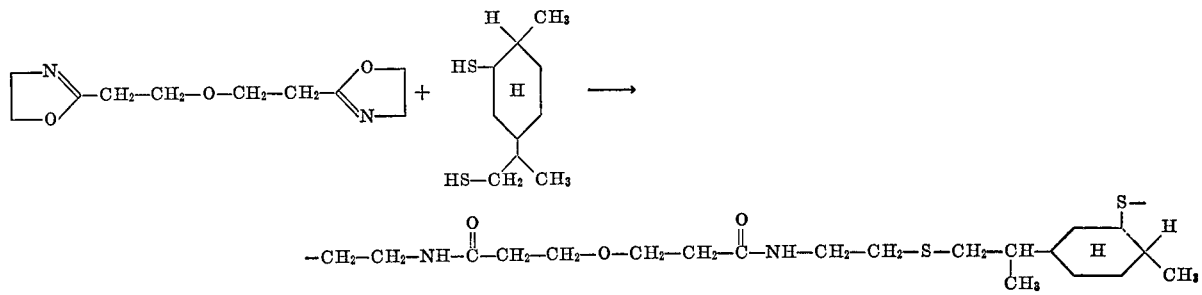

wherein R is alkylene of from 2 to 20, both inclusive, carbon atoms, arylene of from 6 to 10, both inclusive, carbon atoms, arylalkylene of from 7 to 15 carbon atoms, both inclusive, R' in each occurrence is independently selected from hydrogen, alkyl of from 1 to 4, both inclusive, carbon atoms: and X is oxygen or sulfur, and R'' is of the scope of R as herein defined, or cycloalkylene of from 4 to 7, both inclusive, carbon atoms, and $m$ represents 0 or 1 and where $y$ is at least about 30.

2. Polymer of claim 1 consisting essentially of recurring units of the structure

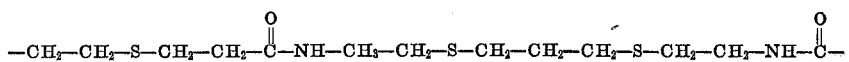

3. Polymer of claim 1 consisting essentially of recurring units of the structure

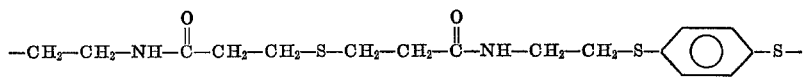

4. Polymer of claim 1 consisting essentially of recurring units of the structure

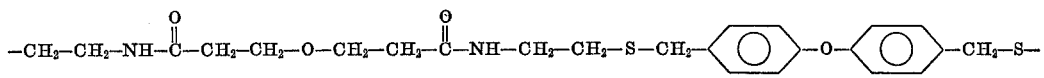

5. Polymer of claim 1 consisting essentially of recurring units of the structure

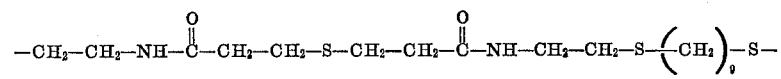

6. Polymer of claim 1 consisting essentially of recurring units of the structure

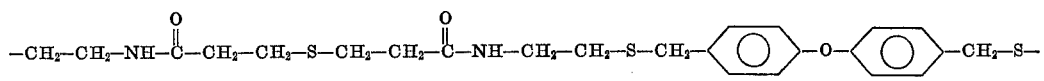

7. Polymer of claim 1 consisting essentially of recurring units of the structure

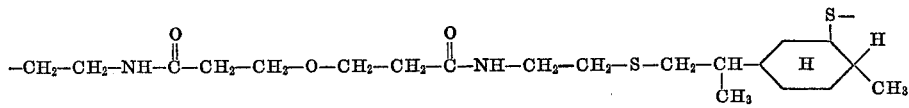

8. Polymer of claim 1 consisting essentially of recurring units of the structure

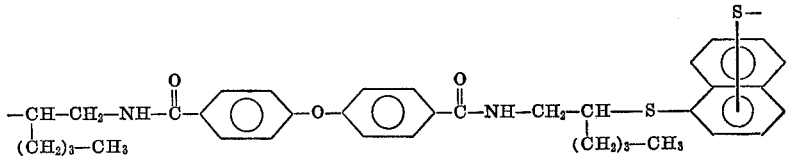

9. Process of producing a polymer of claim 1 which comprises the step of combining a compound of the formula

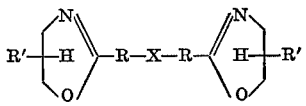

with a hydrogen sulfide or a compound of the formula

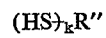

and heating the resulting mixture to a temperature between 25° and 150° C. to achieve polymerization, wherein R is alkylene of from 2 to 20, both inclusive, carbon atoms, arylene of from 6 to 10, both inclusive, carbon atoms, arylalkylene of from 7 to 15 carbon atoms, both inclusive, R'' in each occurrence is independently selected from hydrogen, alkyl of from 1 to 4, both inclusive, carbon atoms: and X is oxygen or sulfur, and wherein R'' is of the scope of R, as defined above, or can additionally be cycloalkylene of from 4 to 7 both inclusive, carbon atoms, and $k$ is a whole integer of from $>1$ to all available substituent sites on R''.

References Cited

UNITED STATES PATENTS

| | | | |
|---|---|---|---|
| 3,476,712 | 11/1969 | Fukui et al. | 260—78 |
| 3,507,830 | 4/1970 | Feinauer | 260—47 |
| 3,563,920 | 2/1971 | Tomalia et al. | 260—2 |
| 3,630,996 | 12/1971 | Tomalia | 260—47 |
| 3,639,395 | 2/1972 | Tomalia | 260—240 |

WILLIAM H. SHORT, Primary Examiner

L. L. LEE, Assistant Examiner

U.S. Cl. X.R.

260—2 EC, 47 EC, 78 R, 79, 830 P, 830 S